(12) United States Patent
Chun et al.

(10) Patent No.: US 9,669,541 B2
(45) Date of Patent: Jun. 6, 2017

(54) ROBOT ARM AND ROBOT COMPRISING THE SAME

(71) Applicant: Hyundai Motor Company, Seoul (KR)

(72) Inventors: Joo Young Chun, Gyeonggi-do (KR); Hun Keon Ko, Seoul (KR)

(73) Assignee: Hyundai Motor Company, Seoul (KR)

( * ) Notice: Subject to any disclaimer, the term of this patent is extended or adjusted under 35 U.S.C. 154(b) by 326 days.

(21) Appl. No.: 14/513,848

(22) Filed: Oct. 14, 2014

(65) Prior Publication Data

US 2015/0165618 A1    Jun. 18, 2015

(30) Foreign Application Priority Data

Dec. 18, 2013 (KR) .................. 10-2013-0158790

(51) Int. Cl.
B25J 3/04          (2006.01)
B25J 9/10          (2006.01)

(52) U.S. Cl.
CPC ......... *B25J 9/104* (2013.01); *Y10T 74/20323* (2015.01)

(58) Field of Classification Search
CPC ....... B25J 9/104; B25J 17/025; B25J 19/0029
See application file for complete search history.

(56) References Cited

U.S. PATENT DOCUMENTS

| 4,531,885 | A  | * | 7/1985 | Molaug | ............ B25J 9/046 414/7 |
| 9,080,425 | B2 | * | 7/2015 | Zediker | ............ B63G 8/001 |
| 9,321,179 | B2 | * | 4/2016 | Inoue | ............ B25J 17/02 |
| 2004/0199147 | A1 | * | 10/2004 | Nishizawa | ........... A61B 17/062 606/1 |
| 2008/0229861 | A1 | * | 9/2008 | Inoue | ............ B25J 19/0029 74/490.01 |
| 2009/0242535 | A1 | * | 10/2009 | Minato | ............ B23K 9/133 219/137.31 |
| 2011/0132880 | A1 | * | 6/2011 | Kossowan | ............ B23K 9/048 219/76.14 |
| 2014/0014638 | A1 | * | 1/2014 | Artelsmair | ............ B23K 9/126 219/130.01 |
| 2014/0202276 | A1 | * | 7/2014 | Song | ............ B25J 9/046 74/490.05 |
| 2016/0008905 | A1 | * | 1/2016 | Izawa | ............ B25J 15/0019 219/130.1 |

FOREIGN PATENT DOCUMENTS

| JP | H03111194 | 5/1991 |
| JP | 2011152620 A | 8/2011 |
| JP | 2013-244562 A | 12/2013 |
| KR | 10-2011-0080922 | 7/2011 |
| KR | 10-2012-0104892 | 9/2012 |
| KR | 10-2013-0057362 A | 5/2013 |

* cited by examiner

*Primary Examiner* — David M Fenstermacher
(74) *Attorney, Agent, or Firm* — Mintz Levin Cohn Ferris Glovsky and Popeo, P.C.; Peter F. Corless

(57) ABSTRACT

Disclosed herein is a robot arm including a first joint portion connected to an end portion of a wire and operable to rotate when the wire is pulled, a second joint portion connected to the first joint portion through a link, and a wire guide composed of a rotational plate rotatably installed at the second joint portion and a pair of idle rollers provided to continuously contact the rotational plate, in which the wire passes between the idle rollers.

12 Claims, 3 Drawing Sheets

(A)

(B)

ROBOT ARM AND ROBOT COMPRISING THE SAME

CROSS-REFERENCE(S) TO RELATED APPLICATION

The present application claims priority of Korean Patent Application Number 10-2013-0158790 filed on Dec. 18, 2013, the entire contents of which application are incorporated herein for all purposes by this reference.

BACKGROUND (a) Technical Field

The present disclosure relates to a robot arm and a robot including the robot arm. More particularly, the present disclosure relates to a robot arm and a robot including the robot arm, which prevents the length of a wire from being changed by rotation of a joint in a robot arm having a plurality of joints driven by the wire.

(b) Background Art

A robot arm, in particular, a wearable robot arm used in an industrial setting is typically composed of a plurality of links and joints to move together with an arm of the wearer. The robot arm adds assistance force to the motion of the wearer to allow the wearer to easily transport a weighted object by holding the object.

In the related art, a motor is provided in each joint of the wearable robot arm, and as a result, a plurality of motors are provided throughout the arm. But, the plurality of motors cause the weight of the robot arm to be excessively increased, and as the wearer becomes fatigued due to the excessive weight, working efficiency significantly deteriorates.

Accordingly, in order to solve this problem, in recent years, a motor has not been provided for each joint, but a wire connecting the plurality of joints and a driving unit driving the wire has been provided instead. Also, the plurality of joints have been moved by a small number of driving units, thereby decreasing the weight of the robot arm. However, the length of the wire cannot be changed while a relative angle of links is changed when the robot arm operates by applying tension to the wire for operating a specific link.

The above information disclosed in this Background section is only for enhancement of understanding of the background of the disclosure and should not be taken as an acknowledgement that this information forms the related art already known to a person having ordinary skill in the art.

SUMMARY OF THE DISCLOSURE

The present disclosure has been made in an effort to provide a robot arm and a robot provided with the robot arm, including a wire guide that allows a wire to pass through the center of a joint in which an angle is changed at all times so as to prevent the length of a wire joined with a specific link from being changed due to a change in angle between links.

In a preferred embodiment, a robot arm may include: a first joint portion connected with an end portion of a wire to rotate when the wire is pulled; a second joint portion connected with the first joint portion through a link; and a wire guide composed of a rotational plate rotatably installed at the second joint portion and a pair of idle rollers provided to continuously contact the rotational plate, in which the wire passes between the idle rollers.

An insertion shaft inserted into the second joint portion may be provided on the rotational plate, and a bearing is provided on an outer circumferential surface of the insertion shaft. As a result, the second joint portion may be rotatable around the insertion shaft. A pair of idle roller shafts may be inserted in a shaft direction of the rotational plate, and the idle roller may be provided at an end portion of the idle roller shaft. The pair of idle rollers may be provided to protrude outwardly from the rotational plate. The pair of idle rollers may be placed so that a point where the pair of idle rollers contact each other is continuously positioned on a central axis line of the rotational plate. The pair of idle rollers may be placed so that a point where the pair of idle rollers contact each other is continuously positioned on a central axis line of the second joint portion. The wire may continuously pass through a contact point of the pair of idle rollers.

A robot arm according to an embodiment of the present disclosure may include: a first link, one end of which is connected to a wire and rotates when the wired is pulled; a second link, one end of which is connected rotatably to the other end of the first link; a third link, one end of which is connected rotatably to the other end of the second link; and a wire guide which rotates freely at a location where the second link and the third link are connected to one another and on which a pair of idle rollers contacting each other are provided.

A rotational plate that rotates freely may be arranged on the location where the second link and the third link are connected to one another, and the wire guide is provided on the rotational plate. The contact point of the pair of idle rollers may be disposed on a central axis line of the rotational plate. The wire may run continuously via the contact point of the pair of idle rollers and is bent around the idle roller as an axis when the second link rotates. The idle roller may rotate when the wire is bent such that a line connecting the center of the respective idle roller divides in half the bending angle of the wire.

A robot according to an embodiment of the present disclosure may include a robot arm provided with a first joint portion connected with an end portion of a wire to rotate when the wire is pulled, a second joint portion connected with the first joint portion through a link, and a wire guide on which a pair of idle rollers is provided to continuously contact the rotational plate arranged rotatably on the second joint portion.

According to the robot arm having the aforementioned structure, since the length of the wire is not changed due to the change in angle between the links, a target link to be operated can be accurately controlled. Further, since the structure is not complicated, there is a low concern of operational failure, and operating force can be uniformly and continuously provided to enhance the value of a product.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
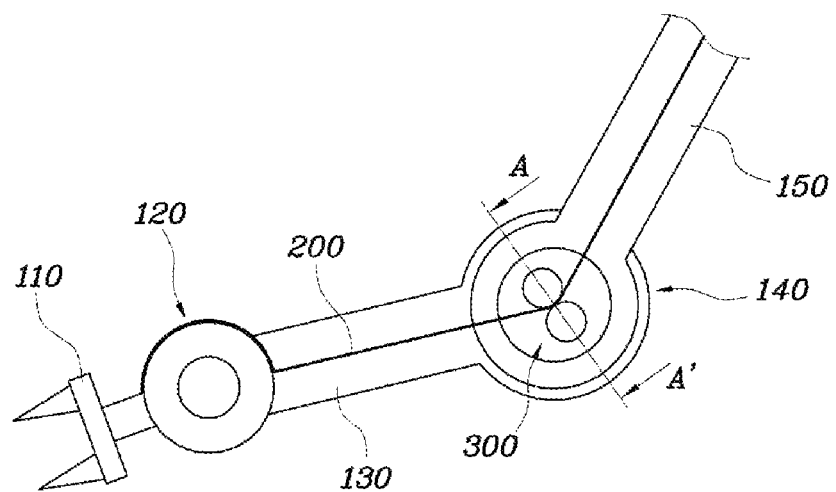
FIG. 1 is a configuration diagram of a robot arm and a robot including the robot arm according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a preferred embodiment of a robot arm and a robot including the robot arm of the present disclosure will be described with reference to the accompanying drawings.

FIG. 1 is a configuration diagram of a robot arm and a robot including the robot arm according to an embodiment of the present disclosure. The robot arm and the robot including the robot arm according to the embodiment of the present disclosure include a first joint portion 120 connected with an end portion of a wire 200 and rotating when the wire 200 is pulled; a second joint portion 140 connected to the first joint portion 120 through a link; and a wire guide 300 composed of a rotational plate 310 rotatably installed at the second joint portion 140 and a pair of idle rollers 331 provided to continuously contact the rotational plate 310, in which the wire 200 passes between the idle rollers 331.

In more detail, the robot arm includes a first link 110, a second link 130, and a third link 150, and may include the first joint portion 120 composed of one end of the first link 110 and one end of the second link 130, which have through-holes to be hinge pin-joined, and the second joint portion 140 composed of the other end of the second link 130 and one end of the third link 150, which also have the through-holes. The wire 200 serves to rotate the first joint portion 120 and the first link 110 in a pulling direction when the wire 200 is pulled. A gripper (not illustrated) or another link may be provided at the first link 110, and the other end of the third link 150 may be joined to a robot upper body (not illustrated) where the robot arm is installed or additionally joined with another link. Alternatively, the second joint portion 140 may be joined to the robot upper body.

Meanwhile, the second link 130 is connected to another wire 200 apart from the wire 200, and as a result, the second link 130 may rotate around a center point of the second joint portion 140 when external force is applied by pulling the other wire 200, and the second link 130 makes a predetermined angle with the third link 150 while rotating. Therefore, in the robot arm according to the embodiment of the present disclosure, even though the angle between the second link 130 and the third link 150 is changed, in order to prevent the resulting change in length of the wire 200, the wire guide 300 is provided at the second joint portion 140 to allow the wire 200 to continuously pass through the center point of the second joint portion 140 regardless of rotation of the second joint portion 140.

Figure 2:
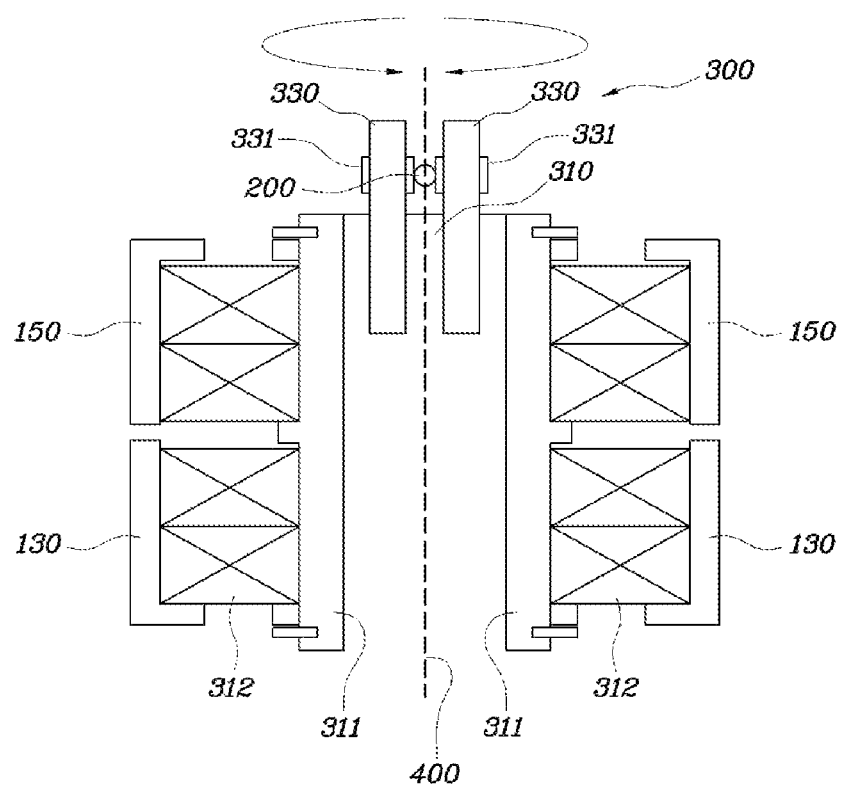
FIG. 2 is a cross-sectional view of the robot arm and the robot including the robot arm, taken along the line A-A according to an embodiment of the present disclosure.

A configuration of the wire guide 300 for the above operation is described in more detail in FIG. 2, where an insertion shaft 311 inserted into the second joint portion 140 is provided on the rotational plate 310, and a bearing 312 is provided on an outer circumferential surface of the insertion shaft 311. As a result, the second joint portion 140 and a third joint portion are provided to be pivotable to the insertion shaft 311.

The rotational plate 310 is provided with one surface thereof exposed to the outside, and the other surface faces the inside of the second joint portion 140. The insertion shaft 311 may be a cylindrical panel formed along an outer circumferential surface of the rotational plate 310 or may be formed in a rod shape of a cylinder that is extended toward the inside of the second joint portion 140 on the other surface of the rotational plate. Various embodiments may be applied to the shape of the insertion shaft 311.

Meanwhile, a pair of idle roller shafts 330 having a circular rod shape is inserted in a shaft direction of the rotational plate 310, and the idle roller 331 is preferably provided at an end portion of the idle roller shaft 330. Further, the pair of idle rollers 331 is preferably provided to protrude outwardly from the rotational plate 310. Therefore, when the idle roller shaft 330 is inserted into the rotational plate 310, one end portion thereof is exposed to the outside, and the idle roller 331 is installed at the exposed end portion. The idle roller 331 may become a separate idle roller 331 made of a different material from the idle shaft, or the idle roller 331 may be configured by forming a protrusion on an end portion of the idle roller shaft 330 along an outer circumferential surface thereof. Further, the idle roller shaft 330 may be inserted into the rotational plate 310 from the outside or may protrude on the rotational plate 310.

Meanwhile, the pair of idle rollers 331 are preferably placed so that a point where the pair of idle rollers 331 contact each other is continuously positioned on a central axis line of the rotational plate 310. To this end, the idle roller shaft 330 and the idle roller 331 are preferably placed to face each other around a central axis line 400 of the rotational plate 310. Further, the pair of idle rollers 331 is preferably placed so that a point where the pair of idle rollers 331 contact each other is continuously positioned on a central axis line of the second joint portion 140. In addition, the wire 200 is preferably configured to continuously pass through the contact point of the pair of idle rollers 331. That is, the wire 200 is positioned to continuously pass between the pair of idle rollers 331.

As a result, the center axis line 400 of the rotational plate 310 continuously coincides with the center axis line of the second joint portion 140, and the wire 200 passes through the central axis line 400 of the rotational plate 310, which is continuously rotatable, and the center axis lines of the second link 130 and the third link 150. As a result, the wire 200 may continuously pass through a predetermined point without any influence from the rotation of the second joint portion 140.

Figure 3:
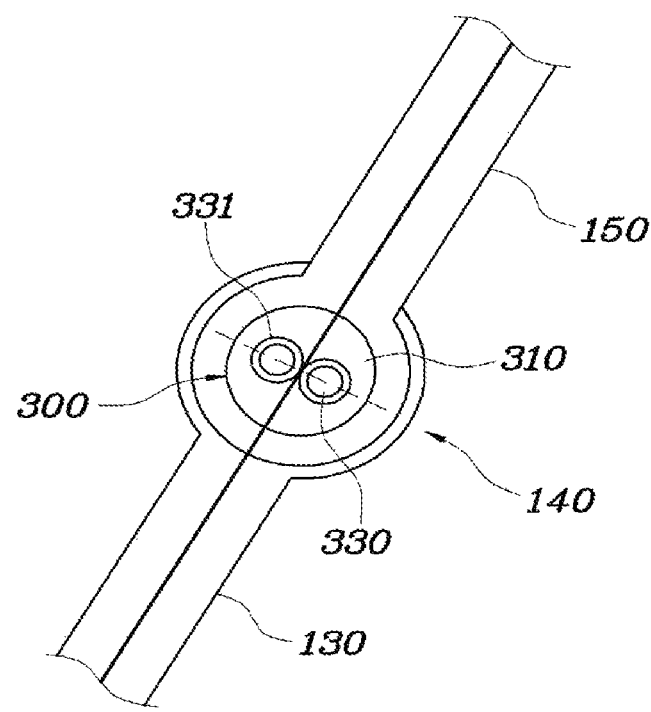
FIG. 3 is a diagram illustrating an operating state of the robot arm and the robot including the robot arm according to an embodiment of the present disclosure.
Figure 3:
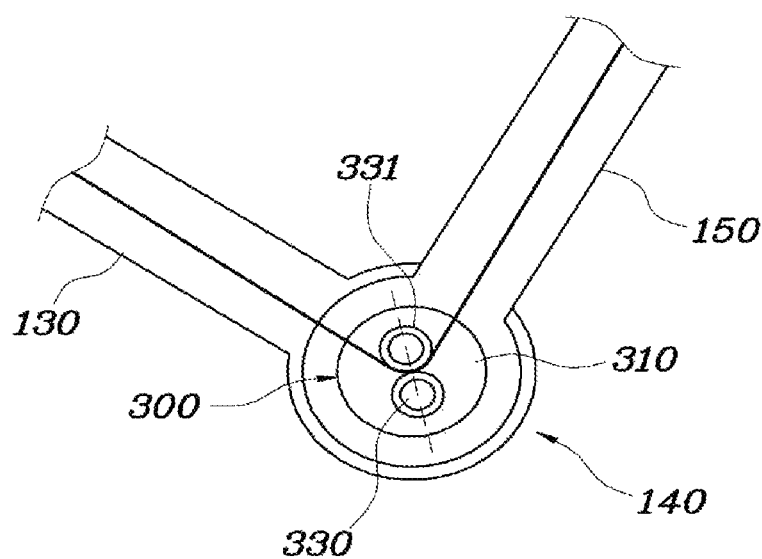

FIG. 3 is a diagram illustrating an operating state of the robot arm according to an embodiment of the present disclosure. As described above, the wire 200 is provided to be connected with the first link 110 and pass between the pair of idle rollers 331. FIG. 3(A) illustrates a case in which the second link 130 and the third link 150 are positioned on the same line, and the wire 200 passes through the center axis line 400 of the rotational plate 310. Then, when the second link 130 is rotated by external force, the second link 130 rotates as illustrated in FIG. 3(B), and the first link 110 also moves together, and as a result, the wire 200 is bent around the idle roller 331. In this case, as the wire 200 is bent, the rotational plate 310 also rotates together, and as described above, the rotational plate 310 is rotatable to the second joint portion 140, and the idle roller 331 is continuously positioned at a bent portion of the wire 200 by a balance of force of the wire 200. Therefore, the idle roller 331 is continuously positioned at the center of a bent portion of the wire 200 regardless of a bent angle of the wire 200. That is, a line connecting the centers of the pair of idle roller 331 continuously bisections an angle formed by the wire 200.

The rotational plate 310 is rotatable, and as the idle rollers 331 form a pair, the wire 200 is supported at both sides regardless of a bending degree and a bending direction of the wire 200 (e.g., a clockwise direction or a counterclockwise direction). Thus, the wire 200 may pass through the center axis line 400 of the rotational plate 310, and when the wire 200 is not pulled, a point of the wire 200 that is first positioned on the center axis line 400 of the rotational plate 310 is positioned on the center axis line 400 of the rotational plate 310 even though the wire 200 is bent. Accordingly, since a length from the point of the wire 220 that is positioned on the center axis line 400 of the rotational plate 310 up to an end portion connected with the first link 110 is kept as substantially constant, it is possible to prevent a malfunction and/or a maloperation, even though the wire 200 is bent due to the rotation of the second link 130.

Meanwhile, where a diameter of the idle roller 331 is excessive, and the bent angle of the wire 200 is large, the length of the wire 200 may be changed as the wire 200 moves on an outer circumferential surface of the idle roller 331. As a result, the diameter of the idle roller 331 is preferably set to a value to minimize the length change by the outer circumferential surface within an allowable range of the bent angle of the wire 200.

According to the robot arm having the aforementioned structure, a target link to be operated can be accurately controlled because the length of the wire 200 remains constant despite a change in angle of the link. Also, the structure is not complicated, and as a result, there is a low concern of failure, and a uniform operating force can be continuously provided, thereby enhancing the value of a product.

The contents of the disclosure have been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A robot arm, comprising:
 a first joint portion connected to an end portion of a wire and operable to rotate when the wire is pulled;
 a second joint portion connected to the first joint portion through a link; and
 a wire guide composed of a rotational plate rotatably installed at the second joint portion and a pair of idle rollers provided to continuously contact the rotational plate, in which the wire passes between the idle rollers,
 wherein an insertion shaft inserted into the second joint portion is provided on the rotational plate, and a bearing is provided on an outer circumferential surface of the insertion shaft, such that the second joint portion is rotatable around the insertion shaft.

2. The robot arm of claim 1, wherein a pair of idle roller shafts is inserted in a shaft direction of the rotational plate, and each of the pair of idle rollers is provided at an end portion of one of the pair of idle roller shafts, respectively.

3. The robot arm of claim 1, wherein the pair of idle rollers is provided to protrude outwardly from the rotational plate.

4. The robot arm of claim 1, wherein the pair of idle rollers is placed so that a point where the pair of idle rollers contact each other is continuously positioned on a central axis line of the rotational plate.

5. The robot arm of claim 1, wherein the pair of idle rollers is placed so that a point where the pair of idle rollers contact each other is continuously positioned on a central axis line of the second joint portion.

6. The robot arm of claim 1, wherein the wire continuously passes through a contact point of the pair of idle rollers.

7. A robot arm, comprising:
 a first link, one end of which is connected to a wire and rotates when the wired is pulled;
 a second link, one end of which is connected rotatably to the other end of the first link;
 a third link, one end of which is connected rotatably to the other end of the second link; and
 a wire guide which rotates freely at a location where the second link and the third link are connected to one another and on which a pair of idle rollers contacting each other are provided.

8. The robot arm of claim 7, wherein a rotational plate that rotates freely is arranged on the location where the second link and the third link are connected to one another, and the wire guide is provided on the rotational plate.

9. The robot arm of claim 8, wherein a contact point of the pair of idle rollers is disposed on a central axis line of the rotational plate.

10. The robot arm of claim 7, wherein the wire runs continuously via a contact point of the pair of idle rollers and is bent around one or more of the pair of idle rollers as an axis when the second link rotates.

11. The robot arm of claim 10, wherein the one or more of the pair of idle rollers rotates when the wire bends such that a line connecting the center of the one or more of the pair of idle rollers divides the bending angle of the wire in half.

12. A robot, comprising:
 a robot arm provided with a first joint portion connected to an end portion of a wire and operable to rotate when the wire is pulled, a second joint portion connected to the first joint portion through a link, and a wire guide on which a pair of idle rollers is provided to continuously contact a rotational plate arranged rotatably on the second joint portion, wherein an insertion shaft inserted into the second joint portion is provided on the rotational plate, and a bearing is provided on an outer circumferential surface of the insertion shaft, such that the second joint portion is rotatable around the insertion shaft.

* * * * *